United States Patent [19]

Crevasse et al.

[11] Patent Number: 4,621,482

[45] Date of Patent: Nov. 11, 1986

[54] METHOD AND APPARATUS FOR FORMING NETTED MEAT PRODUCTS WRAPPED IN AN EDIBLE COLLAGEN FILM

[75] Inventors: Gary A. Crevasse, Rochester Hills; David L. Gammon, Rochester; Michael J. Sullivan, Rochester Hills, all of Mich.

[73] Assignee: Naturin-Werk Becker & Co., Fed. Rep. of Germany

[21] Appl. No.: 724,817

[22] Filed: Apr. 18, 1985

[51] Int. Cl.⁴ .................. B65B 13/20; B65B 11/58
[52] U.S. Cl. ............................ 53/439; 53/449; 53/466
[58] Field of Search .......... 53/429, 530, 466, 439, 53/258, 449, 465; 193/11; 221/63; 426/410, 414

[56] References Cited

U.S. PATENT DOCUMENTS

| | | | |
|---|---|---|---|
| 1,373,812 | 4/1921 | Heath | 193/11 |
| 1,450,104 | 3/1923 | Merli | 53/258 |
| 2,696,442 | 12/1954 | Allbright | 53/439 |
| 2,747,228 | 5/1956 | Braun et al. | |
| 3,014,024 | 12/1961 | Lieberman et al. | |
| 3,290,841 | 12/1966 | Sartore | 53/258 |
| 3,315,299 | 4/1967 | Danielsson | 193/11 |
| 3,344,467 | 10/1967 | Barbu | 17/38 |
| 3,477,860 | 11/1969 | Sartore | 99/174 |
| 3,555,775 | 1/1971 | McMillan | 53/258 X |
| 3,576,243 | 4/1971 | Trunick | 221/63 |
| 3,664,849 | 5/1972 | Autry | |
| 3,945,171 | 3/1976 | Marietta | 53/258 X |

FOREIGN PATENT DOCUMENTS 2476036  8/1981  France ............................ 193/11

OTHER PUBLICATIONS

Article from "Die Fleischwirtschaft" 63 (1983) 5, p. 786 and English Translation.
Canadian Patent Application Ser. No. 487,912 entitled "Use of an Edible Flat Collagen Sheet in the Production of Smoked Foodstuffs, Especially Fish Products and Ham" by Winkler, Filed Jul. 31, 1985, claiming priority to W. German Patent Application No. P 34 31 578.0 filed Aug. 28, 1984.
Advertising of JetNet Corporation entitled "Merchandising Rolled Roasts the JetNet Way".

Primary Examiner—John Sipos
Attorney, Agent, or Firm—Harness, Dickey & Pierce

[57] ABSTRACT

A method and apparatus is disclosed for netting meat products wrapped in an edible collagen film. The apparatus includes a receiving surface into which the meat products are deposited and wrapped with the film. The wrapped meat products are then forced through an extrusion device and into a netting. The apparatus includes a lubrication distribution system for lubricating the surfaces which contact the wrapped meat products. Also associated with the apparatus is a container for storing edible collagen film pieces trimmed to selected lengths and stacked therein.

9 Claims, 7 Drawing Figures

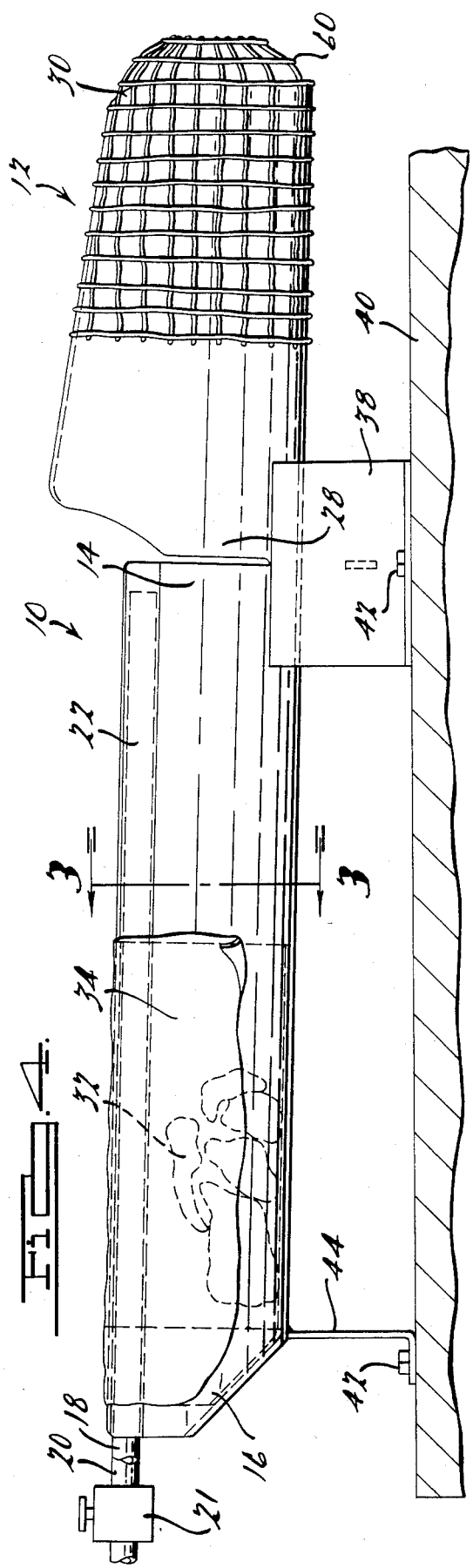
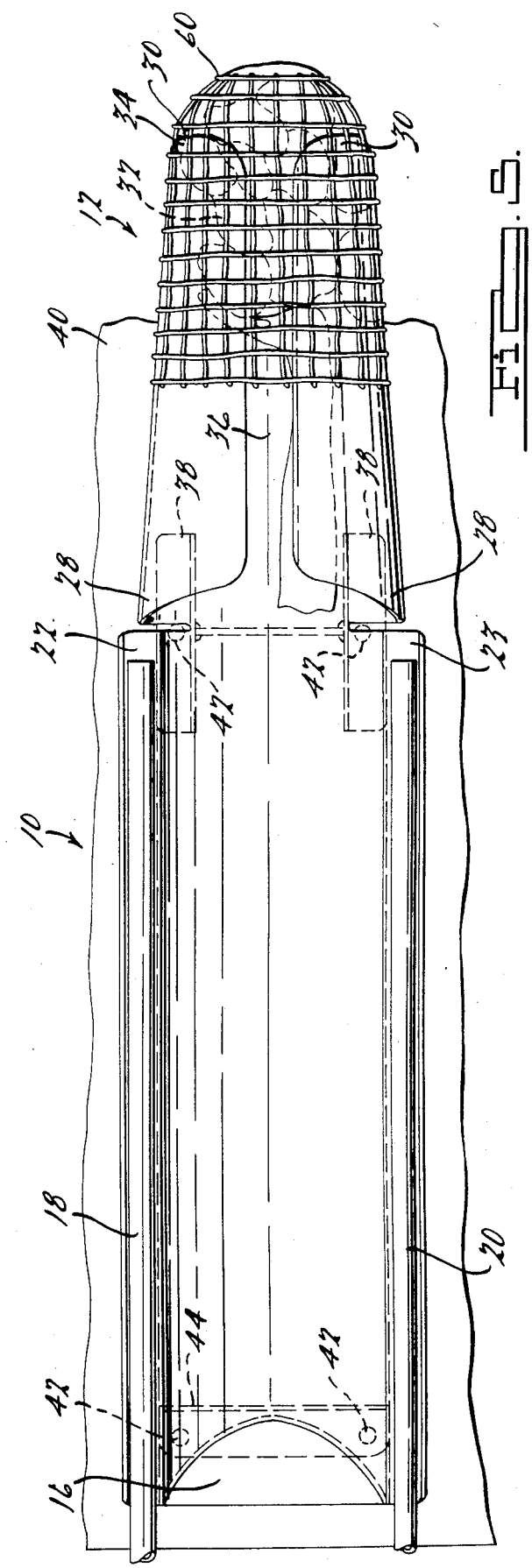

METHOD AND APPARATUS FOR FORMING NETTED MEAT PRODUCTS WRAPPED IN AN EDIBLE COLLAGEN FILM

TECHNICAL FIELD

The present invention relates to a method for forming netted meat products which are wrapped in an edible collagen film and the products formed thereby. This invention also relates to an apparatus particularly suited to form such products. Lastly, the present invention relates to an apparatus for preparing and storing edible collagen film to be employed with the present invention.

BACKGROUND

In an effort to improve quality, productivity, aesthetics, reduce waste, and provide a compact, discrete product for cooking and serving, it has long been a common practice to bond selected cuts of meats into a single formed product, such as hams. This has been attempted by using various methods and devices, including the use of binders, tieing, pressure forming, and elastic netting. The process of netting generally involves placing selected cuts of meat into an elastic netting. The elastic nature of the netting provides a holding force that keeps the cut surfaces of the meat item in close proximity resulting in a compact, firm unit.

Improvements in the art of netted meat products permit the meat to be uniformly and tightly compacted in the netting. Examples of such devices are disclosed in U.S. Pat. No. 3,344,467 to Barbu and U.S. Pat. Nos. 3,290,841 and 3,477,860 to Sartore, which generally comprise a flexible metal sheet formed to the shape of a truncated cone. The smaller end of the cone is surrounded by the netting and the meat portions are deposited into the larger opposing end. Force is then applied to the meat portions which direct same through the cone and into the netting. The truncated cone acts to compact the meat portions into an efficient shape which is retained by the netting. The netted meat product may then be removed from the smaller end of the cone.

The meat item is subsequently cooked or smoked and the netting removed prior to consumption. Removal of the netting generall disrupts the surface of the meat item, because the netting usually is embedded in the meat and often surrounded by meat exudate to the extent that the netting is covered by the exudate. Removal of the netting tears and disrupts the surface of the meat item resulting in yield losses and a very unsightly and unappealing appearance.

It has become known in the art that wrapping meat items in an edible collagen film, prior to the application of the elastic netting, provides a protective barrier that effectively prevents the elastic netting from imbedding into the meat surface. Any exudate issuing from the meat during cooking or processing is contained within the film and does not adhere to the netting and, as a result, the netting is easily removed prior to consumption without disturbing the surface of the meat item.

However, it has been somewhat difficult to wrap the plurality of slippery individual meat pieces with the film and then enclose them with the netting using conventional procedures used in the past that did not employ the film wrap. Attempting to wrap meat products in an edible collagen film and then forcing same through the meat netting apparatus, results in frictional drag between the contacting surfaces of the apparatus and the film. Such friction imposes stress on the film causing the film to be torn or weakened such that it fails upon subsequent physical contact or thermal shock. Further, the known apparatus has been cumbersome to use since there is very little room for spreading the edible collagen film and wrapping the meat products with it. In addition, it is common practice to store edible collagen film on a roll. When a piece of film is desired, an estimated amount of film is unrolled and then cut from the roll. Storing the film in a meat netting environment exposes the film to environmental contaminants, as well as potential physical damage.

DISCLOSURE OF THE INVENTION

The present invention is directed to an apparatus and a method of producing a netted meat product having an edible collagen film disposed between the meat product and the netting. According to one embodiment of the present invention, an apparatus is provided for extruding meat products, wrapped in an edible collagen film into a netting. The apparatus comprises a receiving structure which comprises an open-ended trough portion for receiving a sheet of edible collagen film of sufficient dimension to wrap meat products deposited in the trough on the film. The apparatus further comprises an extruding device which has a first portion open to the trough portion and a second smaller portion for receiving the netting into which the wrapped meat products are extruded. Finally, the apparatus has a lubricating means for distributing a film of lubricant on the surfaces of the receiving and extruding means which contact the edible collagen film during movement of the wrapped meat products into the netting. The lubrication conduits deliver a constant supply of lubricant which flows down the surfaces of the receiving trough and through the extruding means. The lubricant reduces the contact between the peripheral surface of the wrapped meat products and the contacting surfaces of the apparatus, thereby minimizing the stress imposed on the edible collagen film. The lubricant used is preferably water. The lubrication means comprises a pair of lubrication delivery conduits which have perforations located along the axis thereof. The lubrication conduits are secured to the lip portions of the receiving trough.

Individual sheets of the film may be collected and stored in a box-like storage container. The top of the container has an aperture through which individual sheets of edible collagen film may be removed for wrapping the meat products.

In the preferred method, a meat netting is placed over the output side of the extrusion means. Next the lubricant flow is initiated. When the surfaces which contact the edible collagen film wrapper are coated with a film of lubricant, a single piece of edible collagen film is removed from the storage container and placed in the receiving trough. Then meat products are placed upon the film and the film is wrapped therearound. Due to the configuration of the trough, the bottom and most of the sides are automatically wrapped with the film when the meat products are placed thereon thereby facilitating the wrapping step. The wrapped meat is then forced through the extrusion means and into the netting. When the operation is completed the netted meat product may be removed from the extrusion means. The edible collagen film wrapped around the meat product is thereby free from tears and stresses which may cause a subsequent failure of the edible collagen film barrier.

BRIEF DESCRIPTION OF THE DRAWINGS

Additional objects and advantages of the present invention will become apparent by reading the detailed description of the preferred embodiment which makes reference to the following set of drawings:

FIG. 4 is a side view of the apparatus with the meat products having been deposited upon the film;

FIG. 5 is a top view of the apparatus with the wrapped meat products being forced into the netting;

DESCRIPTION OF THE PREFERRED EMBODIMENT

Figure 3:
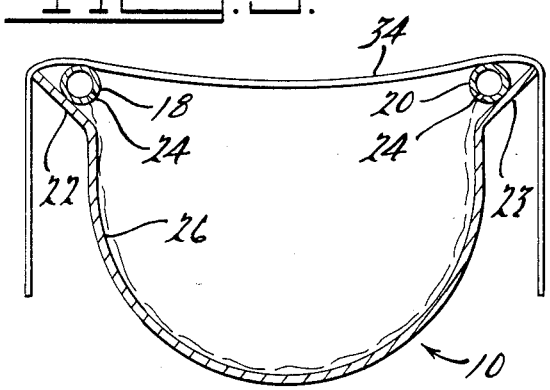
FIG. 3 is a cross-section of an apparatus made in accordance with the teachings of this invention taken along lines 3—3 of FIG. 4, showing an edible collagen film placed in position to receive meat products.
Figure 6:
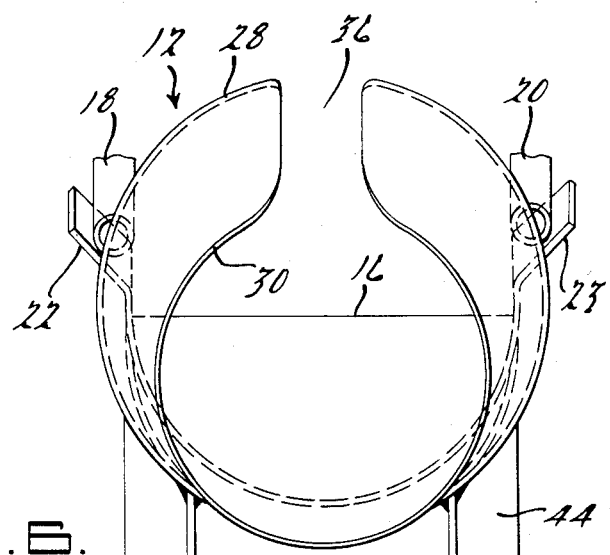
FIG. 6 is an end view of the apparatus with no film in place.

Referring now to the drawings and especially to FIG. 4, an apparatus for netting meat products is shown having a receiving trough 10 and a meat horn 12. The trough 10 has an open first end 14 and a closed second end provided by wall 16. A pair of distribution conduits 18 and 20 are attached to the uppermost lip portions 22 and 23, respectively, of the trough 10. The conduits 18 and 20 have multiple apertures 24, as seen in FIG. 3, distributed along their axis, which permit lubricant 26 to flow therethrough and onto the inside surface of the trough 10. The conduits 18 and 20 preferably include suitable valves such as valve 21 to control the flow of the lubricant.

The quantity and size of apertures 24 and the lubricant pressure are selected such that an even distribution of lubricant is achieved along the inside surface of the trough 10. The lubricant 26 is preferably water, but may be any fluid which is compatible with the meat products 32 and the edible collagen film 34 and does not leave an undesirable residue on the external surfaces of the apparatus and/or the final netted product.

The trough 10 is preferably constructed of a sheet material, such as stainless steel or plastic. The material selected must have a smooth surface to minimize friction. The trough 10 has a generally U-shaped cross-section and an open top. Thus, the trough 10 is basically a three sided receptacle; two of the sides provided by the opposite lateral walls and the third side by end wall 16. The configuration of trough 10 is of significant importance, because it provides the containment necessary to restrict the movement of the individual meat products. Once the meat products are placed on the film, they sink to the bottom of the trough. This sinking action is virtually a self-wrapping one since the meat products are enveloped on most of its three sides by the film by virtue of the configuration of the trough. Consequently, it becomes a relatively simple procedure for the user to finish wrapping other side and top of the group of meat products.

The meat horn 12 has a generally circular cross-section with a first end 28 connected to the first end 14 of the trough 10. The second end 30 of the meat horn 10 has a generally circular cross-section which is smaller in size than the first end 28 of the meat horn 12 such that the overall shape of the meat horn 12 is that of a truncated cone. The meat horn 12 has a generally tapered profile and therefore acts to form or extrude the meat products 32 forced therethrough. Different sizes of meat horns may be selected for producing products having different shapes and sizes.

The meat horn 12 has a longitudinal slit 36 throughout its length (as best seen in FIG. 5). The meat horn 12 is preferably constructed from a resilient sheet material such as stainless steel or plastic. The material selected should have a smooth surface to minimize friction.

The bottom-most inner surface of the trough 12 and the bottom-most inner surface of the meat horn 10 conform with one another and are sloped sufficiently to cause the lubricant 26, distributed by conduits 18 and 20, to flow therethrough and out the second end 30 of the meat horn 12.

The meat horn 12 and the first end 14 of trough 10 are connected together and supported by a bracket 38 which is secured to the foundation 40 by bolts 42. The bracket 38 is joined to the meat horn 12 and the trough 10 by welding. Bracket 44 supports the second end 16 of trough 10. Bracket 44 is secured to the second end 16 of trough 10 by welding and to the foundation by bolts 42. The dimensional difference between bracket 38 and bracket 44 establishes a slope, which causes the lubricant 26, distributed in trough 10, to flow therethrough and out the second end 30 of meat horn 12. Shims or spacers (not shown) may be used in conjunction with bracket 44 and bracket 38 to provide adjustability in slope and/or account for dimensional irregularities in the surface of foundation 40.

Figure 2:
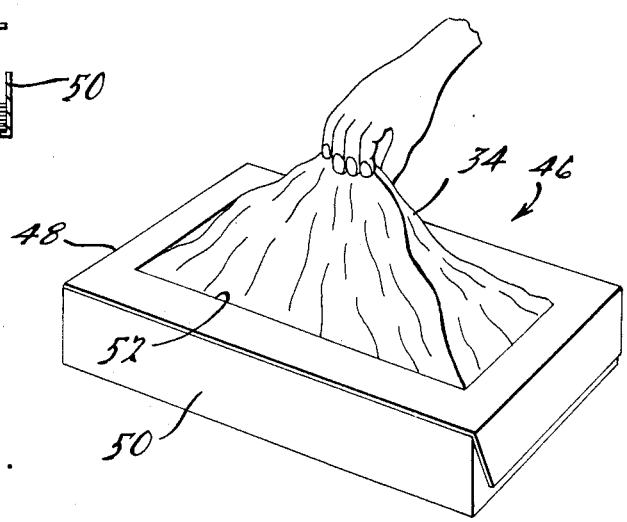
FIG. 2 is a perspective view of the storage container showing a single edible collagen film being removed through the aperture located in the top member.

As seen in FIG. 2, the edible collagen film 34 for use with the present apparatus is stored in a container 46 which has a top member 48 hinged to a bottom member 50 which cooperate with one another to form a box-like storage compartment. The top member 48 has an aperture 52 through which individual sheets of edible collagen film 34 may be removed. The container size is dictated by the size of the edible collagen film stored therein. The size of the edible collagen film is determined by the film size required to wrap meat products.

Figure 1:
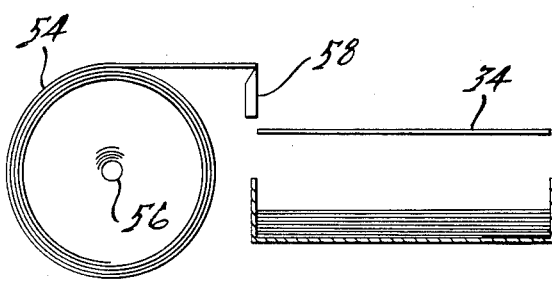
FIG. 1 is a side view of a device used to unroll a storage roll of the edible collagen film, including a trimming blade, and a cross-sectional view of the bottom portion of a storage container.

As shown in FIG. 1, the edible collagen film 34 is stored in a roll 54. The edible collagen used is obtained from the corium of a cow's hide. Once the hide is removed from the cow, the outer portion (approximately 2 to 4 mm) is removed for leather production and the inner part is cleared of any meat, fat, or loose connective tissue. The remaining subcutaneous connective tissue, composed of a close network of collagen fibers, is degraded by chemical and mechanical degradation into the form of a pourable aqueous mass. Plasticisers and cross-linking agents are added to the aqueous mass which is then placed in uniform thickness onto a suitable conveyor belt which is guided through a drying tunnel. When the aqueous mass dries, it takes on the properties of a film, which may be rolled into a storage roll 54. To produce individual sheets of the edible collagen film 34, the storage roll 54 is placed on a spindle 56 and unrolled. While the film is being unrolled, it is trimmed by knife 58 to a desired length. The trimmed film 34 is then stacked in the bottom portion 50 of container 46. When the bottom portion 50 is filled, the top member 48 is placed thereon, thereby providing a sanitary, safe environment for transporting and storing edible collage film for use in the present invention.

The container 46 may be constructed of any material which is capable of withstanding exposure to physical, thermal, and chemical elements and which does not impart an odor, taste, or toxic effect upon the edible collagen film. The top member 48 and the bottom member 50 may be formed of a disposable paper product to eliminate the need to return empty containers from the netting operation to the trimming operation.

Figure 7:
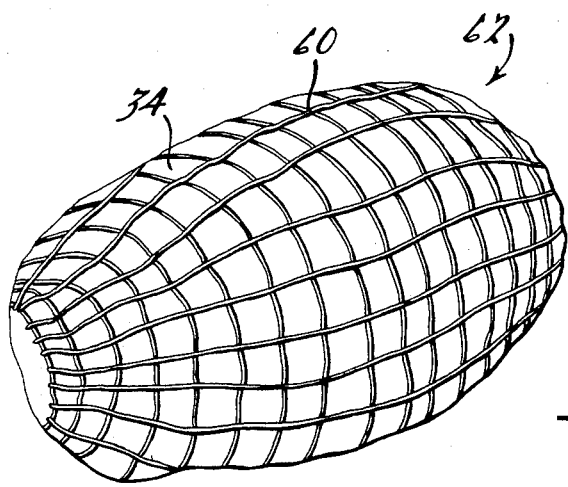
FIG. 7 is a perspective view of the product formed by the present invention.

To perform the meat netting operation, lubricant flow is initiated and adjusted so that a uniform film is distributed across the inner surfaces of the trough 10. Next, a meat netting 60 is placed over the second end 30 of the meat horn 12. Then a single sheet of edible collagen film 34 is removed from the storage container 46 by grasping and drawing same through aperture 52 (as seen in FIG. 2). The edible collagen film 34 is then placed across the lip portions 22 and 23 of the trough 10 (as seen in FIG. 3). The meat products 32 are then placed upon the edible collagen film 34. The edible collagen film 34 is then wrapped about the meat products 32 and forced through the meat horn 12 into the meat netting 60 (as seen in FIG. 5). Thereupon, the netting 60 is removed from the second end 30 of meat horn 12, resulting in final product 62 (as seen in FIG. 7).

The meat products generally consist of pieces of an animal, such as ham, that are often injected with liquid additives. Thus, the meat products are slippery and difficult to handle and contain in a compact area so that they can be wrapped with the film. However, pursuant to this invention, this can be done quickly and easily since the walls of the trough 10 act to contain the meat products in a compact area and serve to conform the collagen sheet about the bottom and three of the sides of the group of meat products when they fall to the bottom of the trough. It then becomes an easy task for the user to grasp the edges of the sheet and fold them over the top of the meat products to finish the wrapping step. Once wrapped, the lubrication on the surfaces of the apparatus prevent damage to the film as the wrapped meat products are stuffed into the netting. The final netted product 62 is then ready for subsequent processing such as smoking to form smoked hams, beef roasts or the like.

From reading the foregoing specification, those skilled in the art will come to appreciate that it discloses several significant advantages in the meat netting art. The embodiment described is the best mode that is currently contemplated for carrying out the invention. No attempt has been made to list all of the various alternatives and modifications to the general concepts thereof. Such modifications or improvements should become apparent to the skilled practitioner after a study of the drawings, specification, and claims. Therefore, while this invention has been described in connection with a particular example thereof, its true scope should be measured in light of the following claims and equivalents thereto.

We claim:

1. A method for making netted meat products comprising the steps of:
   (1) placing a sheet of film on an open ended trough defined by at least two upright side walls and placing a netting on one end of an extrusion member with the other end of the member connected to said trough;
   (b 2) depositing meat products upon said film whereby the weight of the meat products causes the sheet to substantially conform to the walls of the trough thereby at least partially enveloping the meat products;
   (3) folding the edges of the sheet over the top of the meat products to substantially enclose said meat products with said sheet;
   (4) lubricating the surfaces of said trough and extrusion member that contact said sheet during movement of the wrapped meat product therethrough; and,
   (5) forcing said wrapped meat products from the trough through said extrusion member and into said netting.

2. The method as in claim 1, further comprising the steps of unrolling an edible collagen film storage roll, trimming said film into sheets, and storing said film sheets in a storage box prior to wrapping said meat products in said film.

3. The method of claim 1 wherein the film is an edible collagen film.

4. The method of claim 3 wherein water is substantially continuously applied to said surfaces.

5. The method of claim 4 wherein the water issues from holes in conduits located along upper portions of the trough walls.

6. The method of claim 4 which further comprises providing a rear wall transversely connected between the two upright walls.

7. The method of claim 1 wherein the wrapped meat products are forced manually into said netting.

8. The method of claim 1 which further comprises the step of causing the surfaces to slope towards the netting so that the lubricant flows out of said one end of the extrusion member.

9. A method of making a netted meat product comprising the steps of:
   placing a sheet of edible collagen film on an open ended trough devined by three upright side walls;
   placing a netting on one end of an extrusion member, with the other end of the extrusion member being connected to said trough so that surfaces thereof blend smoothly with surfaces of the extrusion member;
   depositing meat products on said film whereby the weight of the meat products causes the sheet to substantially conform to the walls of the trough thereby at least partially enveloping the meat products;
   manually folding the edges of the sheet over the top of the meat products to substantially enclose said meat products with said sheet;
   creating a flow of lubricant from upper portions of said trough walls and causing it to flow towards said one end of said extrusion member to thereby lubricate surfaces of the trough and the extrusion member that contact said sheet during movement of the wrapped meat products therethrough;
   manually pushing said wrapped meat products from the trough through the extrusion member and into said netting; and
   smoking said netted and wrapped meat products whereby the netting is easily removed prior to consumption without disturbing the surface of the meat products.

* * * * *